US008497996B2

(12) United States Patent
Kauppinen

(10) Patent No.: US 8,497,996 B2
(45) Date of Patent: Jul. 30, 2013

(54) ARRANGEMENT AND METHOD FOR MEASURING RELATIVE MOVEMENT

(75) Inventor: Jyrki Kauppinen, Iimarinen (FI)

(73) Assignee: Gasera Ltd, Turku (FI)

( * ) Notice: Subject to any disclaimer, the term of this patent is extended or adjusted under 35 U.S.C. 154(b) by 246 days.

(21) Appl. No.: 12/794,400

(22) Filed: Jun. 4, 2010

(65) Prior Publication Data

US 2010/0309485 A1 Dec. 9, 2010

(30) Foreign Application Priority Data

Jun. 4, 2009 (FI) .................................... 20095619

(51) Int. Cl.
*G01B 11/14* (2006.01)

(52) U.S. Cl.
USPC ............................ 356/615; 356/496; 356/623

(58) Field of Classification Search
USPC ................. 356/614–623, 491, 511, 477, 345, 356/357, 496, 482, 505, 506, 519
See application file for complete search history.

(56) References Cited

U.S. PATENT DOCUMENTS

| 6,128,082 | A * | 10/2000 | Cloud ........................... 356/503 |
| 6,687,008 | B1 * | 2/2004 | Peale et al. ..................... 356/477 |
| 7,521,668 | B2 | 4/2009 | Kauppinen |
| 2003/0048532 | A1 * | 3/2003 | Lindner et al. ................ 359/511 |
| 2006/0192974 | A1 | 8/2006 | Li |
| 2007/0046953 | A1 * | 3/2007 | De Groot et al. ............. 356/512 |
| 2007/0151325 | A1 | 7/2007 | Kauppinen |
| 2007/0211256 | A1 * | 9/2007 | Medower et al. ............. 356/491 |
| 2010/0128283 | A1 * | 5/2010 | Liesener et al. .............. 356/511 |

FOREIGN PATENT DOCUMENTS

| DE | 198 59 781 A1 | 6/2000 |
| WO | WO 2005/093390 A1 | 10/2005 |

OTHER PUBLICATIONS

Kazuya Goto et al., "A double-focus lens interferometer for scanning force microscopy," *Review of Scientific Instruments*, May 1, 1995, pp. 3182-3185, vol. 66, No. 5, American Institute of Physics, Melville, NY.
I. E. Kozhevatov et al., "Interference Scheme with Transverse Shift of Beams for Remote Precision Monitoring of Parameters of Optical Elements," *Radiophysics and Quantum Electronics*, Jul. 1, 2007, pp. 583-592, vol. 50, No. 7, Kluwer Academic Publishers-Consultants Bureau.
European Search Report dated Sep. 28, 2010, issued by the European Patent Office in corresponding European patent application No. 10 16 4705.
M.L. Junttila et al., "Performance limits of stationary Fourier spectrometers", Journal of the Optical Society of America A, vol. 8, Sep. 1991, pp. 1457-1462.

* cited by examiner

*Primary Examiner* — Hoa Pham
(74) *Attorney, Agent, or Firm* — Buchanan Ingersoll & Rooney PC

(57) ABSTRACT

The present invention relates to an arrangement for measuring relative movement. The measuring arrangement comprises a light source (110, 210) for emitting a light beam, a moving element (120, 220) having a reflective surface (121, 221) adapted to reflect a first wavefront portion of the light beam, and a reference element (130, 230) having a reflective surface (131, 231) adapted to reflect a second wavefront portion of the light beam. The arrangement further comprises detecting means (140, 240) for detecting changes in a spatial interference pattern produced by the light reflected from the moving element and the reference element, and processing means (150, 160, 250, 260) for calculating the relative movement between the moving element and the reference element from the phase change in the detected spatial interference pattern. The invention also relates to a method for measuring relative movement.

13 Claims, 2 Drawing Sheets

ARRANGEMENT AND METHOD FOR MEASURING RELATIVE MOVEMENT

TECHNICAL FIELD OF THE INVENTION

The present invention relates to an arrangement and a method for measuring relative movement according to the preambles of the appended independent claims.

BACKGROUND OF THE INVENTION

Accurate measurement of movement is needed in various high technology applications. The most accurate measurement techniques are based on the use of laser interferometers.

In a Fourier Transform Infrared (FTIR) spectrometer the position of a moving mirror of an IR interferometer is determined by using a He—Ne laser to measure an optical path difference in the interferometer. The position of the moving mirror is measured only at discrete sampling points which are the zero crossing points of the laser interference signal with an interval of $\lambda/2$, where $\lambda$ is the wavelength of the laser light. The movement of the moving mirror can be followed up to even ten meters by a fringe counting system.

When measuring small movements in the range up to a few micrometers the position of a moving element has to be measured continuously. An approach disclosed in U.S. Pat. No. 7,521,668 is based on the use of a Michelson interferometer for measuring the displacement of a sensor, which sensor is arranged to be moveable in response to sound waves. The light beam coming from the light source is focused on the surface of the sensor and the reference mirror of the Michelson interferometer. A phase difference between different parts of the light beam is provided e.g. by tilting the reference mirror whereby a spatial interference pattern is produced on the detectors. The movement of the sensor can then be calculated from changes in the interference pattern.

Even though the tilted Michelson interferometer in U.S. Pat. No. 7,521,668 works well in detecting small movements, it has some disadvantages. The Michelson interferometer is quite sensitive to temperature variations, mainly because the sensor and the reference mirror are situated apart from each other in different interferometer arms, and are thus susceptible to temperature changes between the arms.

The arrangement disclosed in U.S. Pat. No. 7,521,668 is also sensitive to the tilting of the sensor and the reference mirror because in practice the focus of the light beam cannot be arranged exactly on the surface of the sensor and the reference mirror. It is also a disadvantage that the reference mirror must be precisely adjusted in order to obtain accurate measurements of the movement of the sensor. A further disadvantage is that the optical components in the Michelson interferometer must be of a high quality and are thus expensive to manufacture, especially the amplitude splitting beamsplitter.

OBJECTIVES OF THE INVENTION

It is the main objective of the present invention to reduce or even eliminate prior art problems presented above.

It is an objective of the present invention to provide an arrangement and a method for measuring small movements, in the range up to a few micrometers. In more detail, it is an objective of the invention to provide an arrangement and a method for measuring relative movement between a moving element and a reference element.

It is a further objective of the invention to provide a measuring arrangement wherein large tolerances of optical components are acceptable and wherein the need for adjustment of optical components is minimal. It is a further objective of the invention to provide a measuring arrangement without an amplitude splitting beamsplitter. It is also an objective of the invention to provide a measuring arrangement with high measurement precision and wide linear dynamic range.

In order to realise the above-mentioned objectives, the arrangement and method according to the invention are characterised by what is presented in the characterising parts of the appended independent claims. Advantageous embodiments of the invention are described in the dependent claims.

DESCRIPTION OF THE INVENTION

A typical arrangement according to the invention for measuring relative movement comprises a light source for emitting a light beam, a moving element having a reflective surface adapted to reflect a first wavefront portion of the light beam, and a reference element having a reflective surface adapted to reflect a second wavefront portion of the light beam. The typical arrangement according to the invention further comprises detecting means for detecting changes in a spatial interference pattern produced by the light reflected from the moving element and the reference element, and processing means for calculating the relative movement between the moving element and the reference element from the phase change in the detected spatial interference pattern.

The measuring arrangement according to the invention is applied for measuring small movements. The principle of measurement is based on splitting the wavefront of the light beam into the first and the second wavefront portions and detecting phase changes in the spatial interference pattern produced by the interfering wavefront portions of the light beam. With the arrangement according to the invention movements below 0.1 pm in one second measuring time can be measured.

In a measuring arrangement according to the invention the wavefront of the light beam is spatially divided into portions. This differs from a technique which is used in a Michelson interferometer. In a Michelson interferometer the wavefront of the light beam is not divided into wavefront portions. A Michelson interferometer is an amplitude splitting interferometer wherein the amplitude (intensity) of the light beam is divided.

The moving element and the reference element are arranged in such a way that the first wavefront portion of the light beam reflected from the moving element and the second wavefront portion of the light beam reflected from the reference element interfere, producing the interference fringe pattern on the detecting means.

The light beam can be directed to the moving element and the reference element as an undivided wavefront whereupon the wavefront splitting is performed by the moving element and the reference element. In this case, the moving element and the reference element are typically arranged in such a way that at the rest position of the moving element a normal of the reflective surface of the moving element and a normal of the reflective surface of the reference element are non-parallel. That is, at the rest position the moving element is slightly tilted relative to the reference element whereupon the wavefront portions of the light beam reflected from said elements interfere and produce interference fringes.

It is also possible that the wavefront splitting of the light beam is performed by other optical means before directing the wavefront portions to the moving element and the reference element. In this case, the moving element and the reference element are preferably arranged so that their reflective surfaces are essentially parallel and on the same level when the moving element is at the rest position.

The fringe pattern formed has a sinusoidal intensity distribution. When the moving element moves relative to the reference element the position of the interference fringes changes, i.e. the phase of the fringe pattern changes. The movement of the moving element can be calculated by using the least square fit on the interference pattern data. The movement of the fringes can also be calculated by using the complex Fourier transform. The movement of the moving element is obtained by using the phase value of the phase spectrum corresponding to the maximum amplitude value of the amplitude spectrum.

The calculation of the movement of the moving element is performed by the processing means which comprise a processor. The processor is configured to determine the movement of the moving element by first calculating the phase change in the interference pattern and then calculating the movement from this phase change. Typically, the signal received from the detecting means is in an analog form and has to be converted into a digital signal. For this conversion the processing means comprise an analog-to-digital converter (ADC).

The moving element can be arranged to move in different ways. For example, its movement can be translational or rotational, or both. In a preferred embodiment the moving element is arranged to bend in response to disturbances, such as pressure and temperature variations. In some applications the moving element can be a vibrating element.

The reference element can be adjustable in order to change its position relative to the moving element. For example, the tilt of the reference element can be alterable. During the measurement the reference element is preferably kept stationary relative to the light source and the detecting means.

According to an embodiment of the invention the moving element and the reference element are arranged next to each other in such a way that the angle between a normal of the reflective surface of the moving element and a normal of the reflective surface of the reference element is less than 20 degrees. The angle between the normals of the reflective surfaces can also be e.g. less than 10 degrees, less than 5 degrees, or less than 2 degrees. The angle between the normals of the reflective surfaces can be adjustable e.g. by tilting the moving element and/or the reference element.

When the moving element is arranged to move translationally the angle between the normals of the reflective surfaces is approximately fixed. However, when the moving element is arranged to tilt or bend the angle between the normals of the reflective surfaces varies. The moving element can tilt or bend from its rest position e.g. ±10 degrees, ±5 degrees, ±2 degrees or ±1 degrees.

According to an embodiment of the invention the detecting means comprise at least two light detectors. In some applications the detecting means can comprise e.g. at least four light detectors, at least ten light detectors, or at least one hundred light detectors. Preferably, the detecting means comprise an array of light detectors, such as a CCD, CMOS or photodiode array, for detecting the spatial interference pattern.

According to an embodiment of the invention the arrangement comprises light directing means for directing the light from the light source to the moving element and the reference element.

According to a preferred embodiment of the invention the light directing means comprise an angular mirror consisting of a first plane mirror adapted to direct the first wavefront portion of the light beam to the moving element and a second plane mirror adapted to direct the second wavefront portion of the light beam to the reference element. The light directing means can also comprise one or more separate plane mirrors for directing the light beam from the light source to the angular mirror. Also one or more separate plane mirrors can be arranged for directing the first wavefront portion of the light beam from the first plane mirror of the angular mirror to the moving element and the second wavefront portion of the light beam from the second plane mirror of the angular mirror to the reference element.

The angular mirror can be arranged in such a way that the first and the second wavefront portions of the light beam are focused essentially on the moving element and the reference element, respectively.

According to an embodiment of the invention the angular mirror has an opening angle in the range of 175-185 degrees. The opening angle can also be e.g. in the range of 178-182 degrees, or 179-181 degrees. The opening angle can also be e.g. below 180 degrees or above 180 degrees. By an opening angle of the angular mirror it is meant the angle between the reflective sides of the first plane mirror and the second plane mirror.

In some applications two prisms can be used for splitting the wavefront of the light beam and for directing the wavefront portions to the moving element and the reference element.

According to an embodiment of the invention the arrangement comprises light converging means for converging the first wavefront portion of the light beam essentially on the reflective surface of the moving element and the second wavefront portion of the light beam essentially on the reflective surface of the reference element. Preferably, the light converging means comprise a converging lens which is positioned between the light source and the light directing means, such as an angular mirror. It is also possible that the light source comprises means for converging the light beam whereupon additional light converging means are not necessarily needed.

When the moving element and the reference element are arranged to split the wavefront of the light beam the focus of the light beam is arranged either in front of the moving element and the reference element, or in the back of said elements. The distance between the focus of the light beam and said elements can be for example in the range of 0-1 mm or 1-10 mm.

According to an embodiment of the invention the light source is a laser, such as a laser diode. A wideband light source can also be used, the wideband light source having a wavelength of e.g. 400-900 nm.

According to a preferred embodiment of the invention the moving element and the reference element are plane mirrors.

According to another preferred embodiment of the invention the moving element is bendable, such as a cantilever adapted to vibrate in response to disturbances. The cantilever can be manufactured from various materials such as silicon, steel or glass. The cantilever can have a length of 1-5 mm or 5-15 mm, a width of 0.1-1 mm or 1-5 mm, and a thickness of 1-5 µm or 5-15 µm. When the cantilever is used as the moving element, the frame surrounding the cantilever can be used as the reference element.

The present invention also concerns a method for measuring relative movement, which method comprises emitting a light beam, directing the light beam towards a moving element and a reference element, and reflecting a first wavefront portion of the light beam from a reflective surface of the moving element and a second wavefront portion of the light beam from a reflective surface of the reference element. The method according to the invention further comprises detecting changes in a spatial interference pattern, the spatial interference pattern being produced by the light reflected from the moving element and the reference element, and calculating the relative movement between the moving element and the reference element from the phase change in the detected spatial interference pattern.

In other words, in the method according to the invention the wavefront of the light beam is splitted into the first and the second wavefront portions which are arranged to interfere. The movement is then calculated from phase changes in the spatial interference pattern.

According to an embodiment of the invention the step of directing the light beam towards the moving element and the reference element comprises directing the first wavefront portion of the light beam to the moving element by using a first plane mirror of an angular mirror, and directing the second wavefront portion of the light beam to the reference element by using a second plane mirror of the angular mirror.

According to an embodiment of the invention the method comprises converging the first wavefront portion of the light beam essentially on a reflective surface of the moving element and the second wavefront portion of the light beam essentially on a reflective surface of the reference element.

An advantage of the invention is that an amplitude splitting beamsplitter is not needed in measuring small movements. In the measuring arrangement according to the invention the wavefront of the light beam is splitted into wavefront portions whereas in the prior art systems based on Michelson interferometers the amplitude of the light beam is divided.

Another advantage of the invention is that large tolerances of optical components are acceptable and the need for adjustment of optical components is minimal. Loose tolerance requirements of optical components allow mass production without alignment procedure in a manufacturing process. Also the components of the measuring arrangement are inexpensive to manufacture.

Still another advantage is that because the moving element and the reference element are close to each other and are thus susceptible to similar temperatures, the arrangement according to the invention is not sensitive to temperature variations. Also, due to the structure of the measuring arrangement the distance between the elements and the other optical components can be easily increased whereupon the moving element and the reference element can be positioned in a temperature and/or pressure which would be unsuitable for the other optical components of the measuring arrangement. The distance between the elements and the other optical components can be increased with minimal changes to the structure. However, in a Michelson interferometer, if the distance between a moving mirror and a beamsplitter is increased the optical path length in another interferometer arm must also be increased which increases the size of the interferometer.

The moving element and the reference element can be positioned inside a measuring chamber having a window. An advantage is that the light going to and reflecting from the moving element, and the light going to and reflecting from the reference element go through the same window. In the prior art systems based on Michelson interferometers, only the sensor is positioned inside a chamber behind a window. The addition of the window between a beamsplitter and the sensor decreases the performance of the interferometer.

Still another advantage is that with the present invention high measurement precision and wide linear dynamic range can be achieved.

The measuring arrangement according to the invention can be utilised in e.g. pressure sensors, temperature sensors, thermal energy sensors, calorimetry, radiation sensors, atomic force microscopy, photoacoustic sensors for solid, liquid and gas samples, accelerometers, vibration sensors, microphones and small mass measurements.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS OF THE INVENTION

Figure 1:
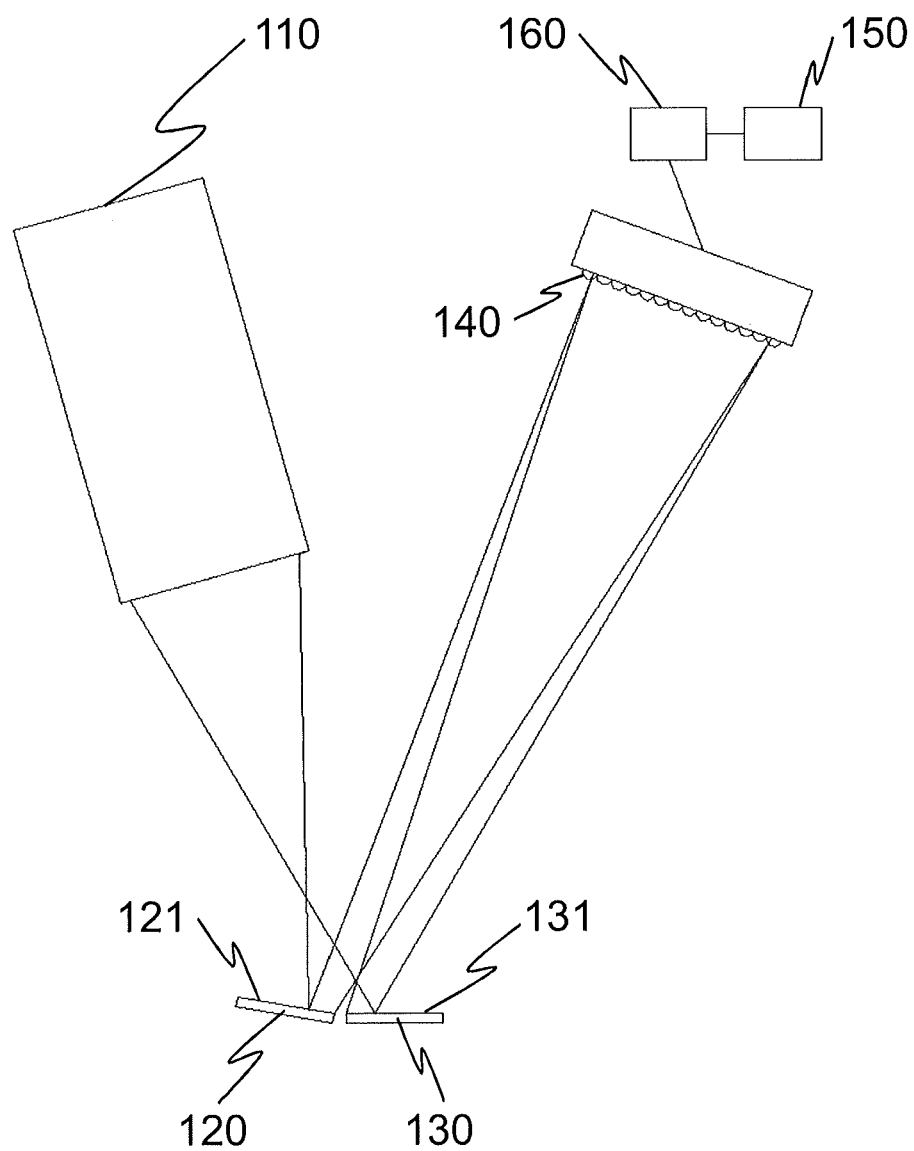
FIG. 1 illustrates schematically an arrangement according to a first embodiment of the invention.

FIG. 1 illustrates an arrangement according to a first embodiment of the invention for measuring relative movement. The arrangement comprises a laser 110 as a light source. The laser 110 emits a light beam towards a moving element 120 and a reference element 130 which both have a reflective surface 121, 131. The light beam is directed to the moving element 120 and the reference element 130 as an undivided wavefront. The focus of the light beam is arranged in front of the moving element 120 and the reference element 130, i.e. the focus of the light beam is between the laser 110 and said elements 120, 130.

The wavefront splitting is performed by the moving element 120 and the reference element 130. The reflective surface 121 of the moving element 120 reflects a first wavefront portion of the light beam, and the reflective surface 131 of the reference element 130 reflects a second wavefront portion of the light beam. The moving element 120 and the reference element 130 are arranged next to each other in such a way that at the rest position of the moving element 120, the reflective surface 121 of the moving element 120 is slightly tilted relative to the reflective surface 131 of the reference element 130. The angle between normals of the reflective surfaces 121, 131 is approximately 10 degrees at the rest position of the moving element 120. In this embodiment the moving element 120 is arranged to bend in response to disturbances, such as pressure and temperature variations. The moving element 120 is allowed to bend a couple of degrees from its rest position. During the measurement the reference element 130 is kept stationary relative to the laser 110.

The wavefront portions of the light beam reflected from the moving element 120 and the reference element 130 overlap and produce an interfering light beam. An interference fringe pattern of the interfering light is detected by an array of light detectors 140. The fringe pattern has a sinusoidal intensity distribution. The spatial interference pattern changes when the moving element 120 bends. The interference fringes move along the array of the light detectors 140, whereupon the phase of the fringe pattern changes.

The calculation of the movement of the moving element 120 is performed by a processor 150 which is configured to determine the movement of the moving element 120 by first calculating the phase change in the interference pattern and then calculating the movement from this phase change. An analog-to-digital converter 160 is used for converting an analog signal received from the light detectors 140 into a digital signal to be processed with the processor 150.

Figure 2:
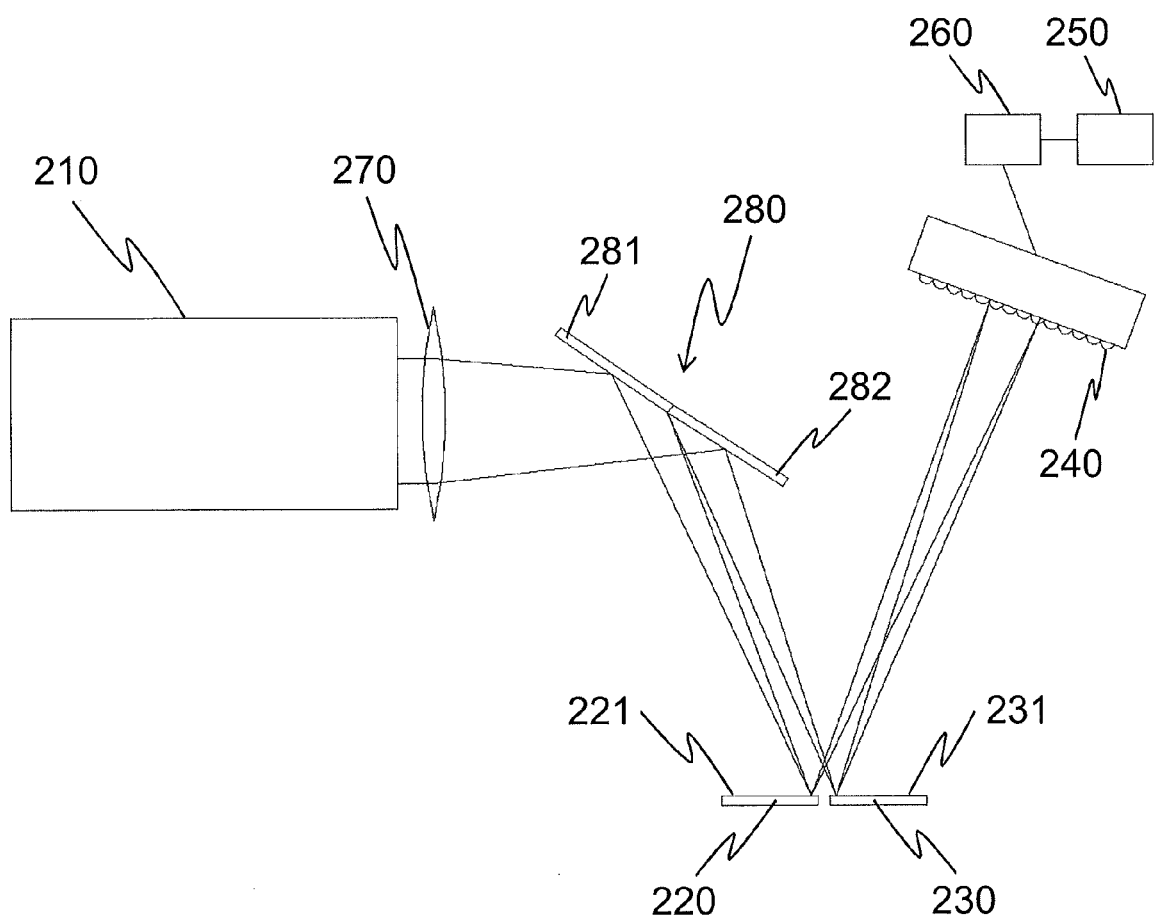
FIG. 2 illustrates schematically an arrangement according to a second embodiment of the invention.

FIG. 2 illustrates an arrangement according to a second embodiment of the invention for measuring relative movement. The arrangement comprises a laser 210 which emits a light beam through a converging lens 270 to an angular mirror 280 consisting of two plane mirrors 281, 282. The first plane mirror 281 is adapted to reflect a first wavefront portion of the light beam to a moving element 220, and a second plane mirror 282 is adapted to reflect a second wavefront portion of the light beam to a reference element 230. In this exemplary embodiment the angular mirror 280 has an opening angle of approximately 182 degrees.

The converging lens 270 is positioned between the laser 210 and the angular mirror 280 in such a way that the first and the second wavefront portions of the light beam are focused essentially on reflective surfaces 221, 231 of the moving element 220 and the reference element 230, respectively. The moving element 220 and the reference element 230 are arranged next to each other in such a way that the first wavefront portion of the light beam reflected from the moving element 220 and the second wavefront portion of the light beam reflected from the reference element 230 interfere, producing an interference fringe pattern on an array of light detectors 240.

The reflective surfaces 221, 231 of the moving element 220 and the reference element 230 are arranged to be essentially parallel and on the same level when the moving element 220 is at the rest position. The moving element 220 is arranged to bend in response to disturbances, and allowed to bend from its rest position ±2 degrees.

When the moving element 220 bends the phase of the spatial interference pattern, produced by the light reflected from the moving element 220 and the reference element 230, changes. An analog signal received from the light detectors 240 is converted into a digital signal by an analog-to-digital converter 260. The calculation of the movement is performed by a processor 250 which is configured to calculate the movement of the moving element 220 from the phase change.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. An arrangement for measuring relative movement, comprising:
   a light source for emitting a light beam;
   a moving element having a reflective surface adapted to reflect a first wavefront portion of the light beam,
   a reference element having a reflective surface adapted to reflect a second wavefront portion of the light beam,
   detecting means for detecting changes in a spatial interference pattern produced by the light reflected from the moving element and the reference element, the detecting means comprising at least two light detectors, and
   processing means for calculating the relative movement between the moving element and the reference element from the phase change in the detected spatial interference pattern.

2. The arrangement according to claim 1, wherein the moving element and the reference element are arranged next to each other in such a way that the angle between a normal of the reflective surface of the moving element and a normal of the reflective surface of the reference element is less than 20 degrees.

3. The arrangement according to claim 1, wherein the arrangement comprises light directing means for directing the light from the light source to the moving element and the reference element.

4. The arrangement according to claim 3, wherein the light directing means comprise an angular mirror consisting of a first plane mirror adapted to direct the first wavefront portion of the light beam to the moving element and a second plane mirror adapted to direct the second wavefront portion of the light beam to the reference element.

5. The arrangement according to claim 4, wherein the angular mirror has an opening angle in the range of 175-185 degrees.

6. The arrangement according to claim 1, wherein the arrangement comprises light converging means for converging the first wavefront portion of the light beam essentially on the reflective surface of the moving element and the second wavefront portion of the light beam essentially on the reflective surface of the reference element.

7. The arrangement according to claim 1, wherein the light source is a laser.

8. The arrangement according to claim 1, wherein the moving element and the reference element are plane mirrors.

9. The arrangement according to claim 1, wherein the moving element is a cantilever adapted to vibrate in response to disturbances.

10. The arrangement according to claim 9, wherein the reference element is a frame surrounding the cantilever.

11. A method for measuring relative movement, comprising:
   emitting a light beam;
   directing the light beam towards a moving element and a reference element;
   reflecting a first wavefront portion of the light beam from a reflective surface of the moving element and a second wavefront portion of the light beam from a reflective surface of the reference element;
   detecting changes in a spatial interference pattern by at least two light detectors, the spatial interference pattern being produced by the light reflected from the moving element and the reference element; and
   calculating the relative movement between the moving element and the reference element from the phase change in the detected spatial interference pattern.

12. The method according to claim 11, wherein the directing the light beam towards the moving element and the reference element comprises:
   directing the first wavefront portion of the light beam to the moving element by using a first plane mirror of an angular mirror, and
   directing the second wavefront portion of the light beam to the reference element by using a second plane mirror of the angular mirror.

13. The method according to claim 11, wherein the method comprises converging the first wavefront portion of the light beam essentially on a reflective surface of the moving element and the second wavefront portion of the light beam essentially on a reflective surface of the reference element.

* * * * *